Dec. 8, 1959  H. J. WARNKEY  2,915,908
PULLEY AND HUB ASSEMBLY
Filed Dec. 1, 1955

INVENTOR
HAROLD J. WARNKEY

BY Cushman, Darby & Cushman
ATTORNEYS 2,915,908
Patented Dec. 8, 1959

United States Patent Office

1

2,915,908
PULLEY AND HUB ASSEMBLY

Harold J. Warnkey, Rocky River, Ohio, assignor to A. J. Rose Manufacturing Company, Cleveland, Ohio Application December 1, 1955, Serial No. 550,433

8 Claims. (Cl. 74—230.8)

This invention relates to improvements in a pulley and hub assembly and to a method for producing the same and, more particularly, to improvements in pulley and hub assemblies made from sheet metal, and which, for example, are adapted to be used with a V-belt.

An object of the present invention is to produce a sheet metal pulley and hub assembly from metal stampings which will be inexpensive to manufacture and yet characterized by maximum strength and wearing qualities.

Another object of the present invention resides in the design of the pulley and hub structure whereby the parts may be assembled in substantially concentric relationship thereby eliminating such stresses and strains as are caused by eccentricity between the hub and the pulley while the parts are rotating.

Yet another object of the present invention is to provide a method for forming a pulley-hub in which two cup-shaped members are telescoped together, preferably in press-fitting relation, with the crowns or webs of the cups contiguous. These webs may be provided with apertures therein for forming a bushing surface for the shaft to which the pulley will be attached.

An additional object of my invention resides in the provision of coextensive, radial flanges on the inner and outer cup-shaped hub members which may be joined together simultaneously with the securing of the hub to the pulley by means of a welding operation or equivalent method, thereby creating a strong and durable unitary pulley and hub assembly.

Other advantages and objects of the present invention will become apparent from the following description and claims considered together with the drawing, in which:

Figure 3:
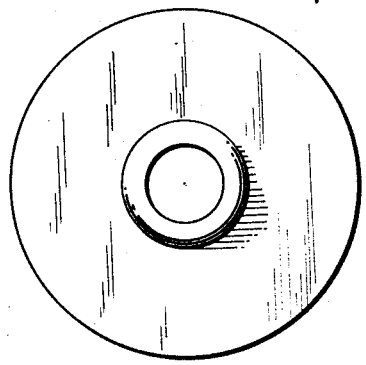
Figure 3 is a plan view of the finished hub structure.
Figure 4:
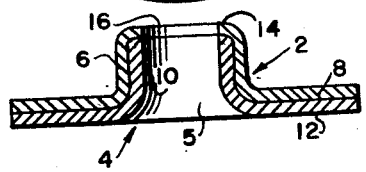
Figure 4 is an elevational, sectional view of the hub structure.

As seen in Figures 3 and 4, the completed hub structure of the present invention comprises an outer member 2 and an inner member 4 telescoped therein. These members are defined by cup shapes wherein the outer member 2 has a cylindrical or tubular portion 6, of circular cross-section, terminating at one end in a circular, outwardly extending radial flange 8, while the other member 4 also has a tubular or cylindrical portion 10, of circular cross-section defining an axial bore 5, and a circular, outwardly extending, radial flange 12.

Figure 1:
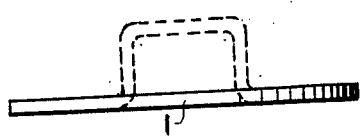
Figure 1 is an elevational view of a sheet or blank of metal which is to be drawn into a cup-shape which will be used to form the hub structure of the present invention.

In producing this hub structure a sheet or blank of metal 1 (Figure 1) undergoes a series of drawing operations in the region defined by the dotted lines to form

Figure 2:
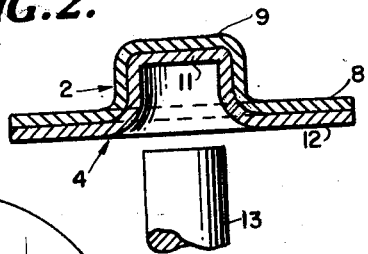
Figure 2 is an elevational, sectional view of two cup-shaped members, telescoped together prior to a punching operation for removing the crowns or webs of the members.

2 the outer member 2 or first stamping having a flanged cup-shape or hat-shape with a web or crown 9. The inner member 4 or second cup-shaped stamping, having a web or crown 11, is formed by a similar process with the outer diameter of the second stamping 4 of such size as to have a press fit within the first stamping 2, wherein the flanges 8, 12 and webs 9, 11 of each stamping are contiguous and substantially coextensive as seen in Figure 2.

After the two stampings have been assembled as described above, a circularly cylindrical punching tool 13 may operate on the webs 9, 11 to produce an opening in the hub for the reception of a rotary element. Naturally, a suitable backing surface for the punch 13 would be provided for this operation. It will be noted that the outer diameter of the punch is substantially the same as the inner diameter of the second stamping 4 so that the punching operation will completely remove the web 11 of the second stamping 4 while removing only a part of the web 9 of the first stamping 2, thereby leaving an inwardly projecting, radial rim 14 on the outer member 2 to provide an abutting shoulder for the inner member 4. In this respect, the rim 14 defines a circular opening 16 of the same diameter as the diameter of the axial bore 5 of the inner member 4, so that when the completed hub is fitted over a shaft or similar structure, the shaft will be tightly embraced by the hub throughout substantially the entire length of the latter to resist any tendency of the hub to wobble on the shaft.

The flanges 8, 12 may be trimmed to any desired size to accommodate the pulley to be used while the bore 5 and opening 16 may be sized as a final step in the method for making the hub.

Figure 5:
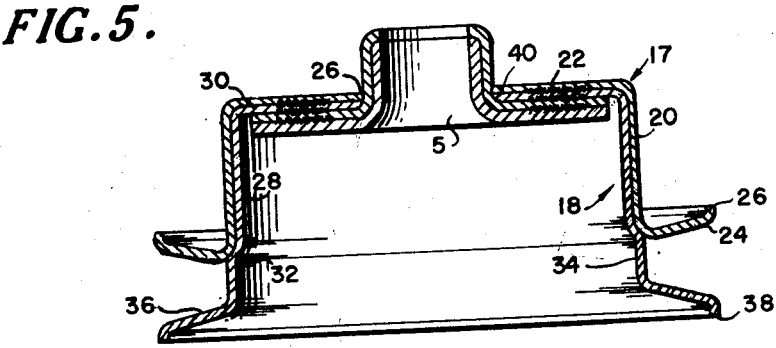
Figure 5 is an elevational, sectional view of the pulley and hub structure of the present invention, as assembled.

Referring now to the pulley structure as illustrated in Figure 5, it will be seen that the pulley comprises an outer cup-shaped member 17 and an inner cup-shaped member 18. The outer pulley member 17 is provided with a tubular or cylindrical portion 20 having a web 22 at one end and deformed outwardly and backwardly at the other end defining an annular flange 24 having a lip portion 26 thereon. The web 22 has a centrally disposed aperture 26 therein for the reception of the hub. The inner pulley member 18 is provided with a first cylindrical portion 28 having a web 30 at one end thereof and a tapering shoulder 32 at the other end thereof. The web 30 is also provided with a centrally disposed aperture 40 therein. The shoulder 32 is integral with a second cylindrical portion 34, the latter terminating in an outwardly and forwardly disposed annular flange 36 having a lip portion 38 thereon.

When the inner pulley member is telescoped within the outer pulley member, the webs 22, 30 are contiguous and tapering shoulder 32 provides an abutment or stop for the curved end portion of the outer member which joins the flange 24 with the tubular portion 20. A groove is formed in the pulley by the flanges 24, 36, and the cylindrical portion 34 for the reception of a V-belt.

After the pulley and the hub have been constructed, the hub is inserted in the aligned apertures 40, 26 in the pulley members with the flange 8 on the outer hub member contacting the inner surface of the pulley inner member web 30, while the axial surfaces of the apertures in the webs 30, 22 of the pulley members embrace the outer surface of the outer hub member for concentrically positioning the hub within the pulley. After the parts have been thus associated, the flanges 8, 12 and the webs 22, 30 may be simultaneously projection or spot welded or secured by any suitable means, providing a unitary pulley and hub assembly.

The application of the completed pulley to a shaft should be apparent to those skilled in the art. The hub is fitted over a rotary member and secured thereto by any suitable means such as a key, or set screw or bolts.

It is to be understood that while a preferred embodiment of the present invention has been described in considerable detail, modifications thereof will be apparent to those skilled in the art, and it is therefore my intention to limit the scope of the invention not by such detailed description but by the appended claims.

I claim:

1. A hub for transmitting rotative movement between rotatable elements comprising an outer member formed of sheet metal and having a tubular portion of circular cross-section terminating at one end in an inwardly projecting, radial rim defining a substantially circular opening at said one end, and terminating at the other end in an outwardly directed radial flange; a bushing formed of sheet metal including a tubular portion of circular cross-section press fitted within said outer member with one end of said tubular portion abutting the rim of said outer member, the inner diameter of said bushing being the same as that of said opening, the other end of said tubular portion extending radially outwardly to define a radial flange contiguous with first said-named flange, and means for securing said flanges together.

2. A hub for transmitting rotative movement between rotatable elements comprising an outer member of sheet metal having a tubular portion circular in transverse cross-section, and terminating at one end in an inwardly projecting radial rim defining a circular opening and at the other end in an outwardly extending radial flange; a tubular sheet metal bushing circular in transverse cross-section having an outer diameter approximating the inner diameter of the tubular portion of the outer member and telescoped therein with one end of said bushing abutting the rim of said outer member, the other end of said bushing being defined by an outwardly extending radial flange contiguous with and welded to said first named flange, and the inner diameter of said bushing being the same as that of said opening.

3. A method of making a hub structure comprising forming a first cup-shaped member with a radially extending flange at one end thereof, forming a second cup-shaped member with a radially extending flange at one end thereof, telescoping said second cup-shaped member within said first cup-shaped member with the webs of said cup-shaped members and said flanges in contiguous relationship, removing the entire bottom of said second member and at least a part of the bottom of said first member and subsequently welding said flanges together.

4. A pulley and hub assembly comprising a cup-shaped outer pulley member having a cylindrical portion terminating at one end in an annular flange and at the other end in a web, said web being provided with an aperture; a cup-shaped inner pulley member having a first cylindrical portion telescoped within said outer member, and a second cylindrical portion on said inner member larger than said first cylindrical portion and said first and second cylindrical portions being joined by a tapering shoulder against which said one end of said outer member abuts, said inner member further having a web provided with an aperture therein, said webs being contiguous and coextensive with the apertures therein coaxially disposed; and hub means comprising telescoping inner and outer members, each of said hub members having a flange and a tubular portion, said tubular portions being disposed in said apertures of said pulley members and said flanges being welded to said webs on said pulley members.

5. A method of making a hub comprising forming a first cup-shaped member with a radially extending flange at one end thereof, forming a second cup-shaped member with a radially extending flange at one end thereof, press fitting said second member within said first member with the webs and flanges of said members in contiguous relationship, removing at least a part of the webs of said members and welding said flanges together.

6. A method of making a hub structure comprising forming an inner hat-shaped member, then forming an outer hat-shaped member, and then arranging said members into press-fit relation with the webs of said hat-shaped members contiguous, and then removing at least a part of the webs of said members.

7. A method of making a hub structure as set forth in claim 6 wherein the entire web of said inner hat-shaped member is removed after said members are press-fitted together and the central portion of the web of said outer cup-shaped member is removed.

8. A method of making a hub comprising forming inner and outer hat-shaped members to press-fit and contiguous relation with each other, and thereafter removing a portion of the webs of each of said members, and securing the flanges of said member together.

References Cited in the file of this patent

UNITED STATES PATENTS

| | | |
|---|---|---|
| 1,301,506 | Riise | Apr. 22, 1919 |
| 1,310,502 | O'Connor | July 22, 1919 |
| 1,742,484 | Nelson | Jan. 7, 1930 |
| 1,817,891 | Claus | Aug. 4, 1931 |
| 1,902,224 | Eksergian | Mar. 21, 1933 |
| 1,972,789 | Newkirk | Sept. 4, 1934 |
| 2,301,399 | Heim | Nov. 10, 1942 |
| 2,493,053 | Zatyko | Jan. 3, 1950 |
| 2,551,763 | Schley | May 8, 1951 |
| 2,622,934 | Phelps | Dec. 23, 1952 |
| 2,680,380 | Bagley | June 8, 1954 |
| 2,741,134 | Bagley | Apr. 10, 1956 |
| 2,787,914 | Nelson | Apr. 9, 1957 |